2 Sheets—Sheet 1.

J. H. THOMAS.
HORSE HAY-RAKES.

No. 194,013. Patented Aug. 7, 1877.

Witnesses:
A. Ruppert
Wm H Bates

Inventor.
J. H. Thomas
D. P. Holloway & Co
Attys.

2 Sheets—Sheet 2.

J. H. THOMAS.
HORSE HAY-RAKES.

No. 194,013. Patented Aug. 7, 1877.

Witnesses:
A. Ruppert,
Wm. H. Bates

Inventor:
J. H. Thomas
D. P. Holloway & Co.
Att'y

UNITED STATES PATENT OFFICE.

JOHN H. THOMAS, OF SPRINGFIELD, OHIO.

IMPROVEMENT IN HORSE HAY-RAKES.

Specification forming part of Letters Patent No. 194,013, dated August 7, 1877; application filed January 18, 1877.

*To all whom it may concern:*

Be it known that I, JOHN H. THOMAS, of Springfield, in the county of Clarke and State of Ohio, have invented a new and useful Improvement in Horse Hay-Rakes, of which the following is a specification:

This invention relates to that class of horse-rakes in which curved elastic teeth of small steel rods are attached to an oscillating rake-head or to the axle, and a clearer is attached to clear the hay from the teeth as the latter are raised.

Figure 1:
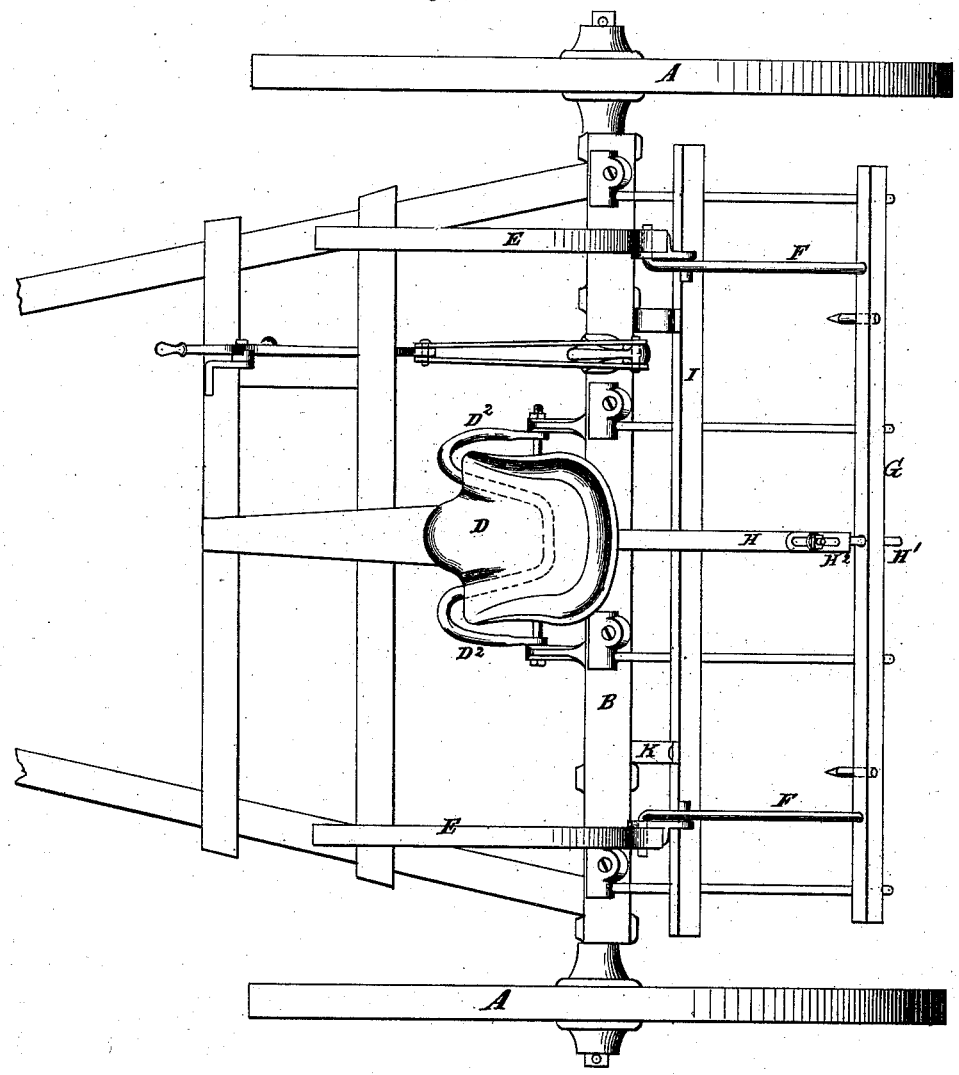
Figure 2:
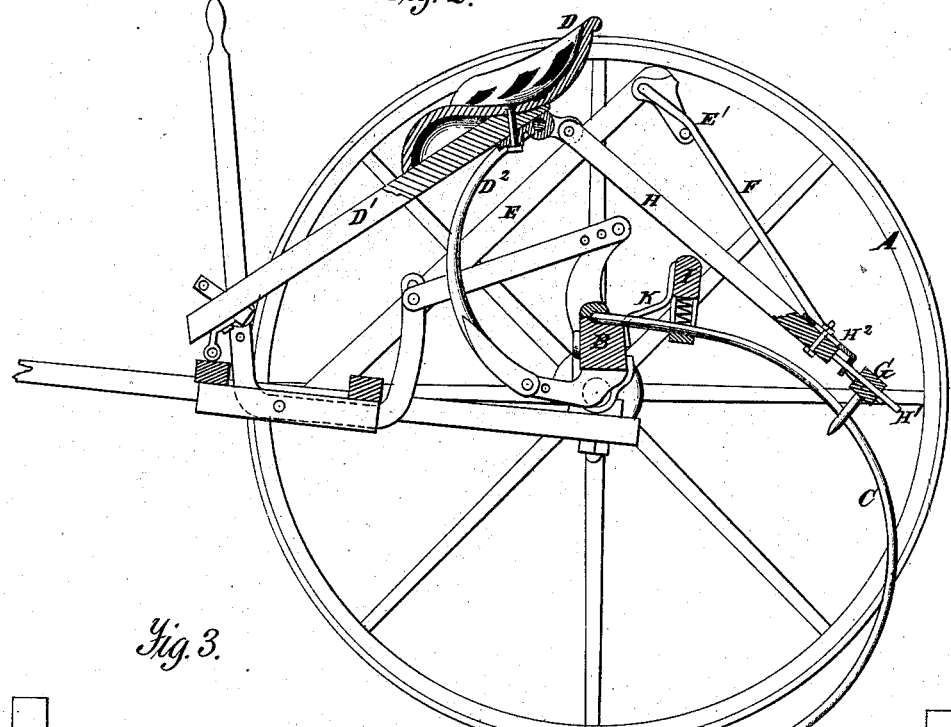
Figure 3:
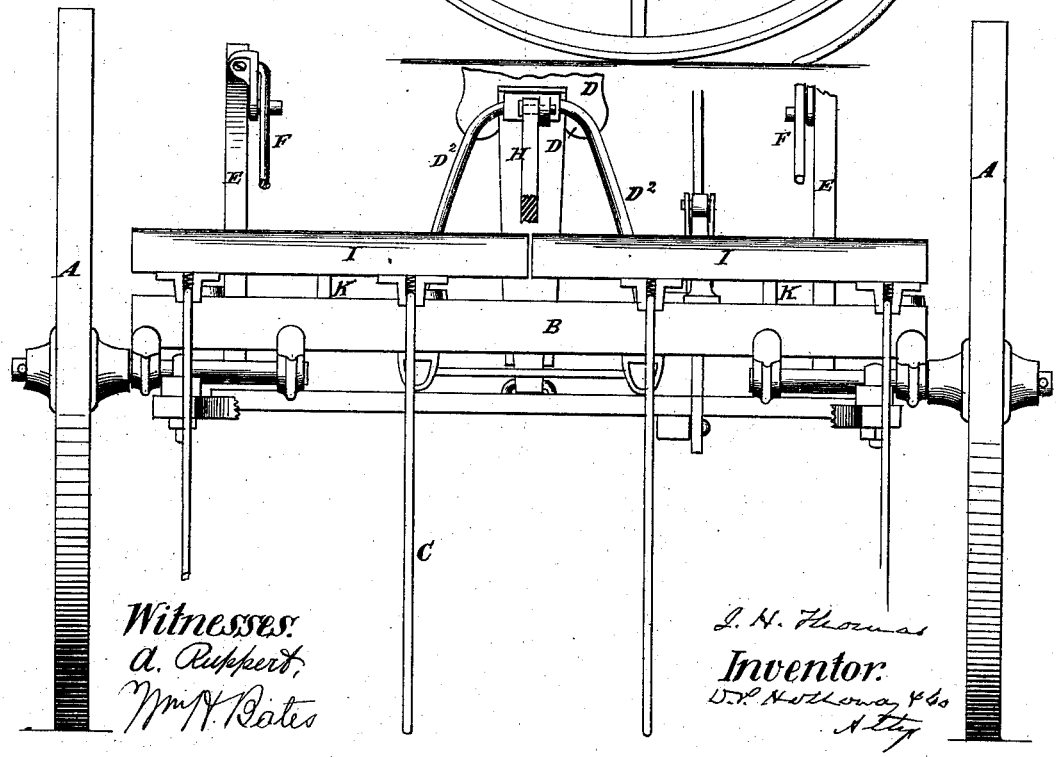

In the annexed drawings, making part of this specification, Figure 1 is a plan view. Fig. 2 is a sectional elevation; and Fig. 3 is an elevation, showing the machine as seen from the rear.

The same letters are employed in all the figures in the indication of identical parts.

The improvements are illustrated as applied to rakes heretofore patented by me, in which the weight of the driver is made to assist in raising the rake; but I do not limit my claims to the features included in this case to any particular kind of rake, but claim them without reference to any other parts.

A A are the wheels. B is the rake-head, in this case turning on the axle or spindles, but which may form the axle and turn in the hubs of the wheels, as is very often the case. C are the steel teeth. D is the driver's seat, attached by the bar $D^1$ to the shaft, and by rods $D^2$ to the rake-head, the seat falling as the teeth are raised, and vice versa. E E are bars, which support rods F F which suspend the clearer G, the bars resting on the brackets $E^1$, so that the clearer does not bear on the rake-teeth. A bar or rod, H, is pivoted to the seat-supports or to the seat, and extends down so that the pin $H^1$ passes through the clearer-bar.

When the rake-teeth are raised the seat descends, and carries with it the upper end of bar H, forcing the latter against the rake-head in such a manner as to raise it, and brace it in such a manner as to keep the clearer constantly above the teeth.

An L-formed slotted bracket, $H^2$, is fastened, by a set-screw, on the lower end of the bar H, to adjust it to bear constantly against the clearer-bar.

There are various modes of supporting the clearer, and attaching the bar H so as to make it support the clearer, and I do not desire to be limited to the one shown. The brackets and pins $E^1$ may be dispensed with, and the clearer held up by a bar attached to the rake-head or axle or to the pressure-bar. And, instead of having the bar H operating as shown, there may be a lever attached to the lower part of the axle, or to an arm projecting from the axle or rake-head and to the bar H, or directly to the clearer, so that as the axle or rake-head turns the clearer will be raised or lowered free from the teeth. Or the bar H may be attached to the hand-lever or rake-frame to hold the clearer free from the teeth. So, also, instead of the bracket $H^2$, there may be substituted a nut or nuts on the pin $H^1$, or a sectional adjustable bar may be made, so that its length may be increased or diminished.

The pressure-bar I is constructed with springs to bear upon the teeth in the usual manner; but instead of making it in one piece, as heretofore, I make it in two or more sections, and attach the sections to the bracket K by pivots when two teeth are connected with one section, so that one tooth only may be raised or dropped when passing over an uneven place. Or the brackets may be made of spring-steel, or the pressure-bars attached to springs, allowing each section carrying one or more teeth to be raised independently.

A clearer similarly operated was shown in the drawings of my Letters Patent 172,206, dated January 11, A. D. 1876, but this part of my invention formed no part of the subject-matter of that patent, but was reserved for the present application.

What I claim as my invention, and desire to secure by Letters Patent, is—

1. The combination of the rising and falling seat, the teeth, the clearer, the supports F for the clearer, and the bar H for moving the clearer free of the rake-teeth, substantially as set forth.

2. In combination with the clearer, the bar H, pivoted to the seat, so that as the seat falls it will force the clearer up, substantially as set forth.

3. In combination with the clearer and its independent supports, the bar H, adjustable as to its length, substantially as set forth.

In testimony whereof I have signed my name to this specification in the presence of two subscribing witnesses.

JOHN H. THOMAS.

Witnesses:
 A. P. LINN COCHRAN,
 ROB'T C. RODGERS.